US011708228B2

(12) United States Patent
Lucas et al.

(10) Patent No.: US 11,708,228 B2
(45) Date of Patent: Jul. 25, 2023

(54) STRUCTURE FOR TRANSPORT AND ORGANIZATION OF LARGE POWER CABLES ON A WELLSITE

(71) Applicant: Halliburton Energy Services, Inc., Houston, TX (US)

(72) Inventors: Bruce Carl Lucas, Duncan, OK (US); Connor David Millican, Duncan, OK (US); Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 16/862,134

(22) Filed: Apr. 29, 2020

(65) Prior Publication Data
US 2021/0032052 A1 Feb. 4, 2021

Related U.S. Application Data (60) Provisional application No. 62/881,903, filed on Aug. 1, 2019.

(51) Int. Cl.
*B65G 67/12* (2006.01)
*B60P 3/40* (2006.01)
*E21B 17/00* (2006.01)

(52) U.S. Cl.
CPC .............. *B65G 67/12* (2013.01); *B60P 3/40* (2013.01); *B65G 2814/0301* (2013.01); *E21B 17/003* (2013.01)

(58) Field of Classification Search
CPC ....... B65D 85/04; E21B 19/084; E21B 19/22; B60P 3/40; B65G 67/12; B65G 1/0442;
(Continued)

(56) References Cited

U.S. PATENT DOCUMENTS 3,086,659 A * 4/1963 Cassel ................ B65G 1/0442
211/153
3,157,424 A * 11/1964 Hall ..................... B65G 1/0442
294/68.3

(Continued)

FOREIGN PATENT DOCUMENTS

| CA | 2928717 A1 | 11/2016 |
| JP | 2007323187 A | 12/2007 |
| JP | 2010265069 A | 11/2010 |

OTHER PUBLICATIONS

International Search Report and Written Opinion for PCT application PCT/US2020/031852 dated Aug. 7, 2020, 3 pages.

*Primary Examiner* — Kaitlin S Joerger
(74) *Attorney, Agent, or Firm* — Conley Rose, P.C.; Rodney B. Carroll (57) ABSTRACT

Embodiments of the disclosure generally concern equipment for use in operations at oil and gas wells, particularly a structure to transport and locate large diameter electrical cables, such as those used to connect turbine generators to electric pumping units on an oil and gas well site. More specifically the embodiments of the disclosure concern methods and apparatus for transporting, positioning, and manipulating large diameter power cables at the well site of oil and gas wells with a cable transport structure using longitudinal cable retaining members to create channels to store the cables and an end rack to fold extra length of the cable back onto the cable transport structure.

21 Claims, 8 Drawing Sheets

(58) Field of Classification Search
CPC . E04B 1/24; E04B 2001/2466; B65H 57/026;
B65H 57/04
See application file for complete search history.

(56) References Cited

U.S. PATENT DOCUMENTS

| | | | |
|---|---|---|---|
| 9,009,976 B2* | 4/2015 | Seow | E21B 19/084 |
| | | | 29/897 |
| 11,377,018 B1 | 7/2022 | Lucas et al. | |
| 2004/0065443 A1 | 4/2004 | Berg et al. | |
| 2014/0332636 A1 | 11/2014 | Seow et al. | |
| 2016/0362950 A1 | 12/2016 | Broussard | |
| 2017/0089060 A1* | 3/2017 | Harper | E04H 5/02 |
| 2020/0332511 A1* | 10/2020 | Ishaq | E04B 1/08 |
| 2021/0032052 A1* | 2/2021 | Lucas | B65G 67/12 |

* cited by examiner

STRUCTURE FOR TRANSPORT AND ORGANIZATION OF LARGE POWER CABLES ON A WELLSITE

CROSS-REFERENCE TO RELATED APPLICATION

This application claims the benefit of U.S. Provisional Patent Application No. 62/881,903, filed Aug. 1, 2019, which is incorporated by reference herein in its entirety.

TECHNICAL FIELD

The exemplary embodiments disclosed herein relate generally to equipment for use in operations at oil and gas wells, and more specifically to methods and apparatus for transporting, positioning, and manipulating large diameter power cables at the well site of oil and gas wells.

BACKGROUND

Equipment used in drilling, fracking, and other oilfield operations often requires power to be supplied through large, heavy power cables, frequently weighing as much as 500 to 600 pounds, or more. In addition, control cables also must be supplied along with the power cables. These cables must be delivered to the well site by truck, then unloaded and arranged on the ground at the well site. The ends of the cables must then be coupled between the desired equipment, such as connecting a turbine generator to electric pumping units on the well site. Because of their size and weight, manipulating these power cables often requires the simultaneous efforts of multiple workers and consumes a substantial amount of time. Further, manipulating such heavy cables also presents the potential for physical injury to the workers. Moreover, these cables must be manually handled one at a time and individually run between the relevant equipment.

Even once the cables are positioned on the well site, they still present difficulties in that large, heavy trucks and other wheeled equipment is often employed on well sites, and when this equipment is driven over the cables, there is a risk that the cables can become damaged. When the cables are no longer required on the well site, then the process must be reversed, and once again, multiple workers are required to rearrange the cables so that they may be loaded back onto trucks for transport off the well site.

Therefore, there is a need for improvements in the field of transporting and manipulating large power cables at well sites.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person ordinarily skilled in the art to synthesize and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

Figure 1:
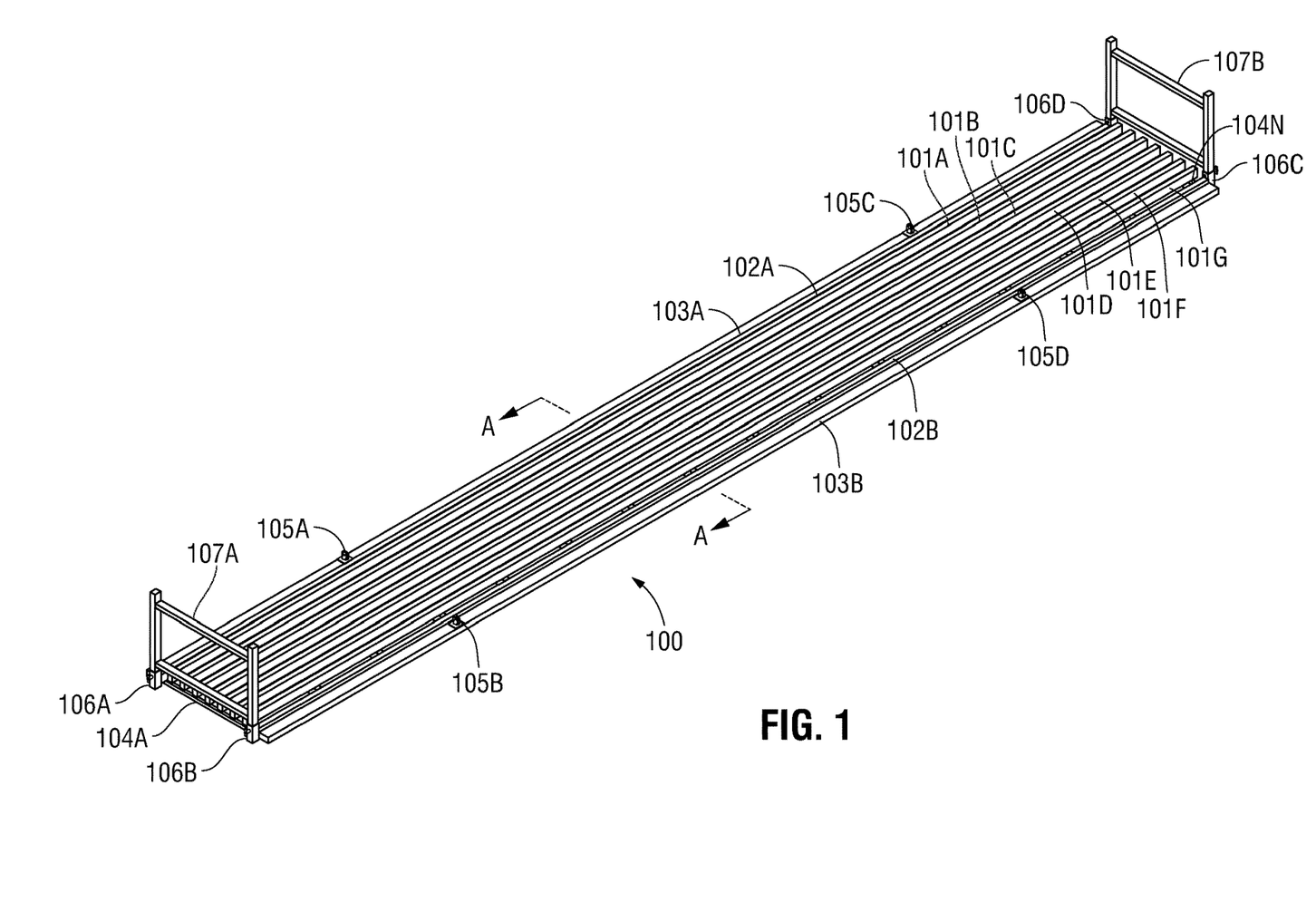
FIG. 1 is an isometric view of a cable transport structure according to some embodiments.

As mentioned above, the embodiments disclosed herein generally relate to a cable transport structure for transporting and positioning large power cables at a well site. FIG. 1 is an isometric view of a cable transport structure 100 according to some embodiments. The structure includes a plurality of longitudinal cable retaining members 101A-101G. Longitudinal cable retaining members 101A-101G provide structural rigidity for cable transport structure 100 and serve to create channels to hold the power cables in place during transportation and use on the well site. In one embodiment, longitudinal cable retaining members 101A-101G may be formed of rectangular steel tubing. The number of longitudinal cable retaining members, as well as the length of each member, may be selected as a matter of design choice. In one embodiment, the length of the longitudinal cable retaining members 101A-101G is substantially the same as the length of a trailer typically used with a conventional semi tractor-trailer truck. The number of longitudinal cable retaining members may be selected such that the overall width of the cable transport structure 100 is approximately one-half of the width of a conventional semi tractor-trailer so that two cable transport structures may be arranged side-by-side on a semi tractor-trailer. In other embodiments, round tubing, flat plate, or other suitable cross-sectional shapes may be used to create the longitudinal cable retaining members as long as a suitable channel is created to retain the power cables.

Longitudinal cable retaining members 101A-101G are attached to transverse structural support members 104A-104N. Transverse structural support members 104A-104N may be constructed from rectangular steel tubing, although other tubing, or flat plate may be used in other embodiments. The number of transverse structural support members as a matter of design choice depending on the anticipated size and weight of the cable transport structure 100 and the size, weight and length of the anticipated cables to be arranged in the structure. In one embodiment, longitudinal cable retaining members 101A-101G may be attached to top sides (i.e., the side facing away from the ground when the cable transport structure 100 is located at the well site) of transverse structural support members 104A-104N by welding, although other methods of attachments, such as bolting may be used as a matter of design choice.

Cable transport structure 100 also includes two longitudinal side members 102A-102B. Longitudinal side members 102A-102B may also be formed from rectangular tubing, although other shapes of tubing or steel plate may be used as well. Longitudinal side members 102A-102B are coupled to the ends of transverse structural support members 104A-104N.

Figure 2:
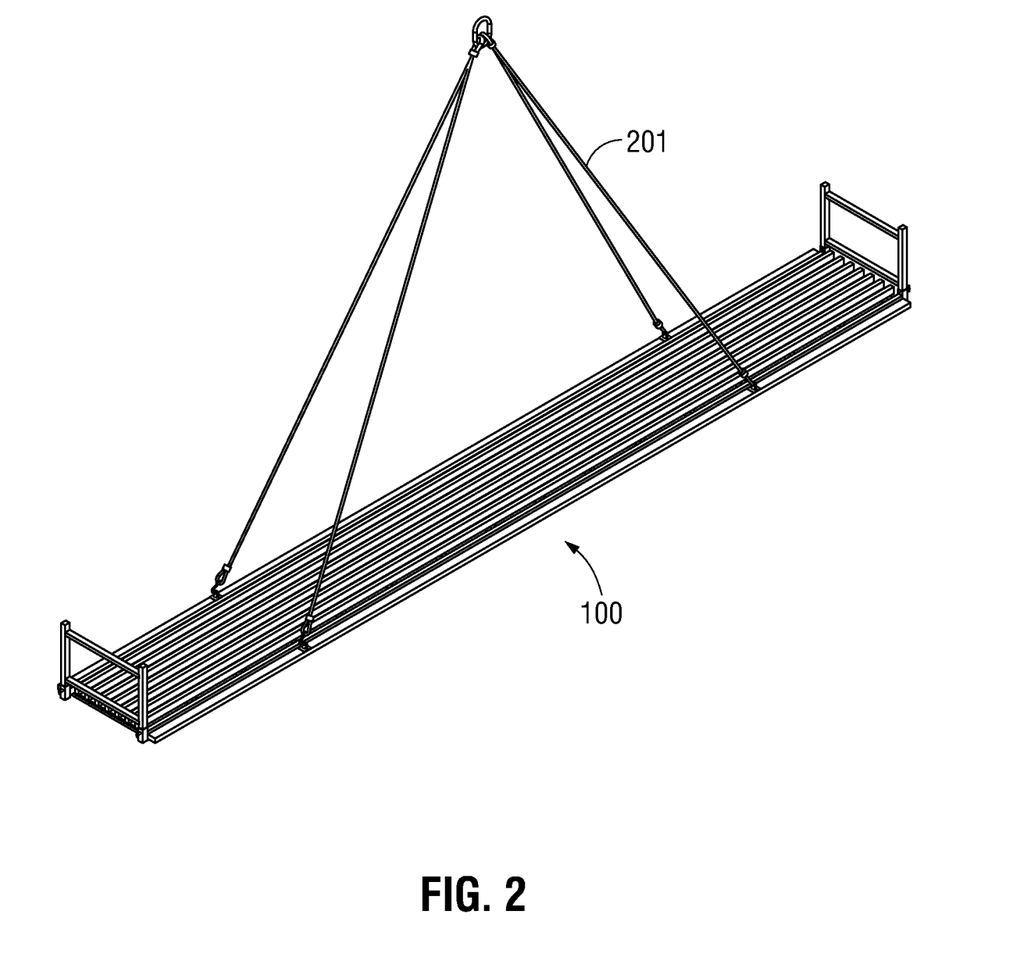
FIG. 2 is an isometric view of a cable transport structure attached to a four-point lifting sling according to some embodiments.

Cable transport structure 100 also includes longitudinal base members 103A-103B arranged along longitudinal side members 102A-102B. Longitudinal base members 103A-103B may be provided with D-ring lifting eyes 105A-105D so that cable transport structure 100 may be lifted with a four-point sling 201 as shown in FIG. 2. This allows the cable transport structure to be lifted on and off a semi tractor-trailer and located as desired at the well site.

Still with reference to FIG. 1, a cable support assembly is provided at one end of cable transport structure 100 that includes rack bases 106A-106B and rack 107A. Rack bases 106A-106B are used to hold in place rack 107A. A second cable support assembly is provided at the opposite end of cable transport structure 100 that includes rack bases 106C-106D used to hold in place rack 107B.

Figure 3:
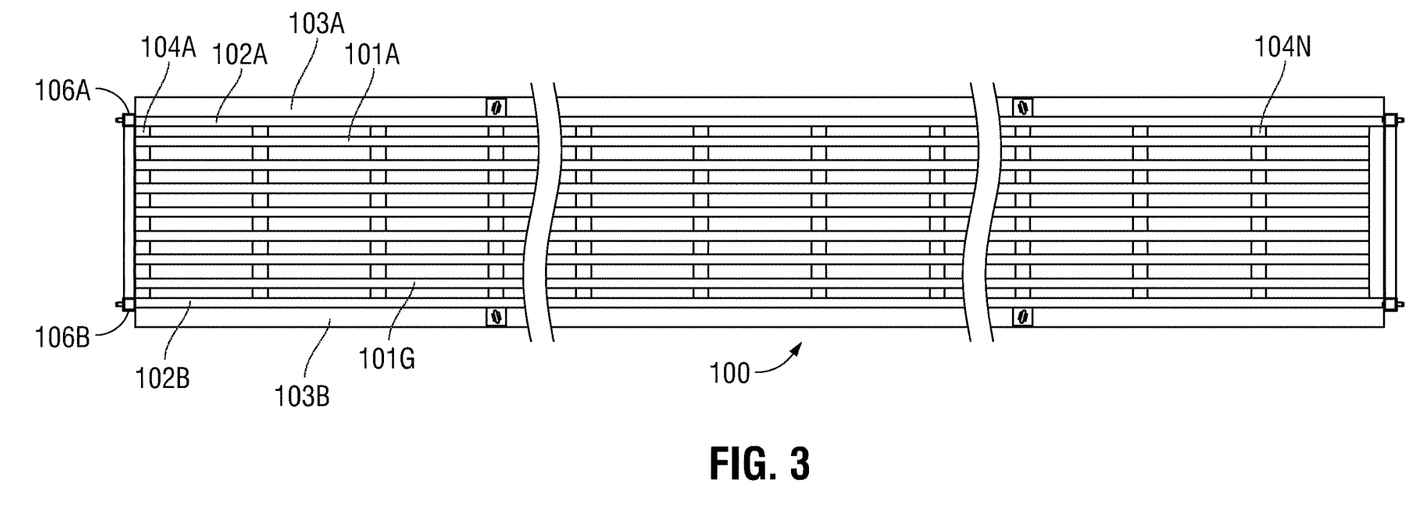
FIG. 3 is a top view of a cable transport structure according to some embodiments.

FIG. 3 is a top view of cable transport structure 100 showing the arrangement of longitudinal cable retaining members 101A-101G, transverse structural support members 104A-104N, longitudinal side members 102A-102B, and longitudinal base members 103A and 103B. Also shown are rack bases 106A-106B. It will be understood that a series of channels are created by the space between longitudinal cable retaining members 101A-101G and longitudinal side members 102A-102B. In one embodiment, the width of these channels is approximately just wider than the outer diameter of the power cable to be laid in the channel. It will also be understood that the channels formed by longitudinal side members 102A-102B may be less deep than the channels formed by longitudinal cable retaining members 101A-101G, which will be explained in more detail with respect to FIGS. 6-7. Therefore, the channels on each side of cable transport structure 100 that are bounded by longitudinal side members may be useful to hold smaller diameter, control cables rather than larger diameter power cables.

Figure 4:
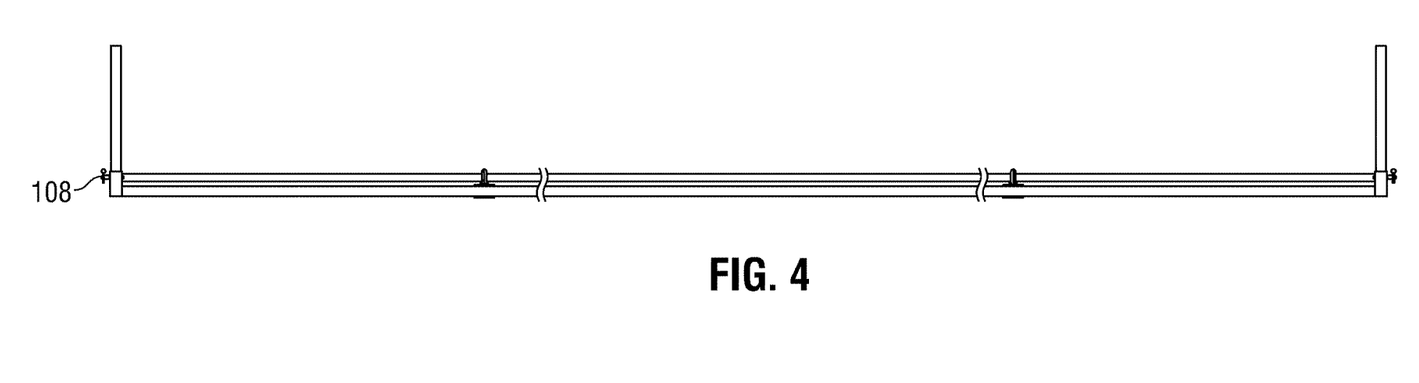
FIG. 4 illustrates a side view of a cable transport structure according to some embodiments.

FIG. 4 is a side view of cable transport structure 100, illustrating the arrangement of racks at each end of the structure. Racks 107A-107B are held in place by quick release pins, such as quick release pin 108.

Figure 5:
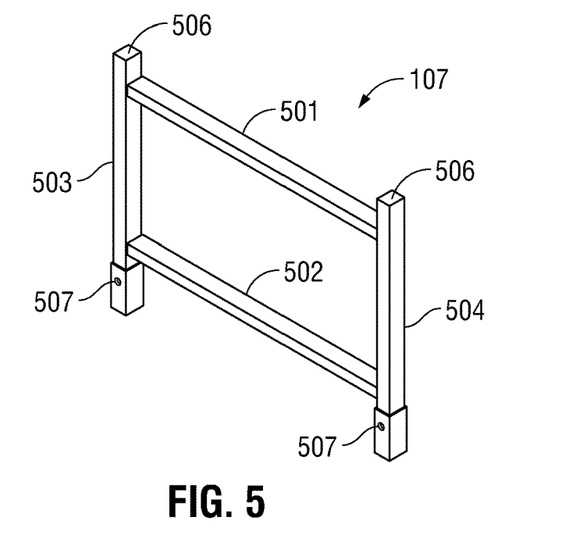
FIG. 5 illustrates an end structure for a cable transport structure according to some embodiments.

FIG. 5 shows a detailed view of a rack 107 according to some embodiments. Rack 107 includes vertical support members 503 and 504, upper cross member 501 and lower cross member 502. If desired, caps 506 may be welded onto support members 503 and 504 to prevent water, dirt or other contaminants from entering the vertical support members, which may be made from rectangular tubular steel. Rack 107 also includes holes 507 to receive quick release pins (not shown) to join the racks to the rack bases of the cable transport structure.

Figure 6:
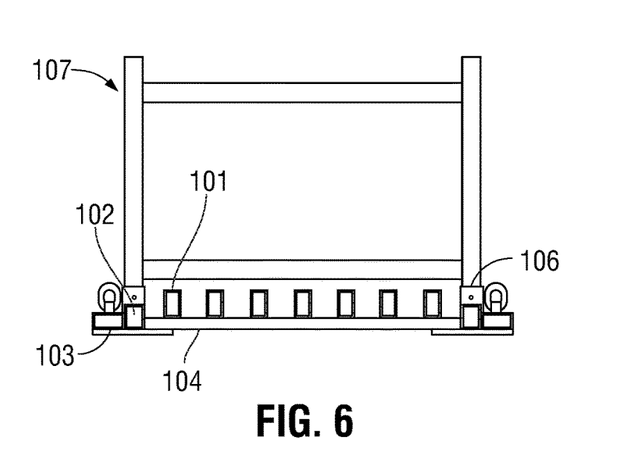
FIG. 6 is a section view of a cable transport structure with an end structure mounted in place with quick release pins according to some embodiments.

FIG. 6 shows a cross-sectional view of cable transport structure 100 taken along section A-A as shown in FIG. 1. Rack 107 is shown arranged in rack base 106 and held in place by quick release pins. The height of longitudinal side members 102 is lower than the height of longitudinal cable retaining members 101, which accommodates release pin. Also, it will be understood that the channel between longitudinal side member 102 and longitudinal cable retaining member 101 is lower in vertical height than the channels between longitudinal cable retaining members 101, therefore, making the outer channels more suitable for control cables rather than power cables. However, it will also be understood that the height of the channels is a matter of design choice and can be different in other embodiments. It will also be noted that longitudinal side members 102 are attached to the ends of the transverse structural support members 104, rather than to the tops of those transverse members as is the case for the longitudinal cable return members 101. Therefore, it may be useful to weld a section of strap or plate on the underside of the transverse structural support members and the longitudinal side members 102 and the longitudinal base member 103 to provide structural integrity.

Figure 7:
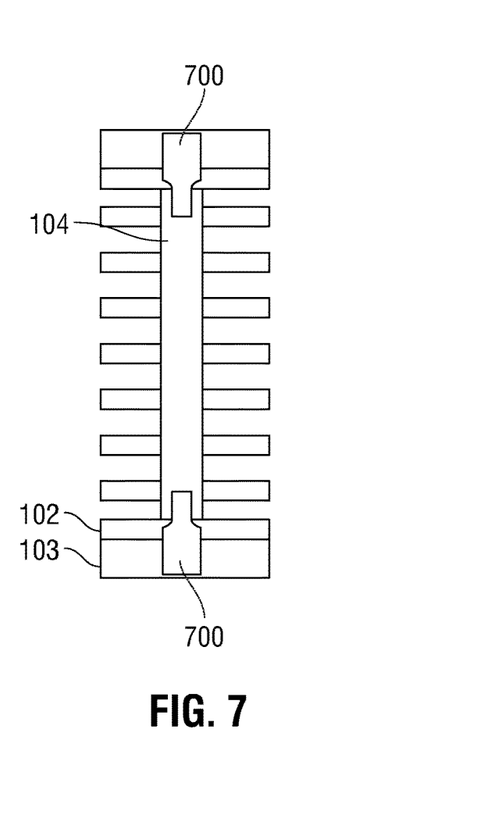
FIG. 7 is a bottom view of a portion of a cable transport structure illustrating the attachment of longitudinal side members and longitudinal base members to a transverse structural support member according to some embodiments.

FIG. 7 is a bottom view of a section of the cable transport structure showing an embodiment of a strap section 700 welded on the underside of the cable transport structure to secure the longitudinal side members 102 and the longitudinal base members 103 to the transverse structural support member 104.

Figure 8:
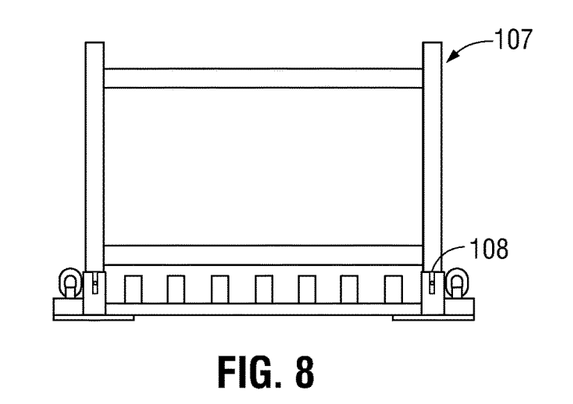
FIG. 8 is an end view of a cable transport structure showing an end structure mounted in place according to some embodiments.

FIG. 8 is an end view of one end of the cable transport structure 100, showing the rack 107 arranged at the end. The rack is arranged and held in place by quick release pins 108 to allow for quick installation and removal of the rack.

Figure 9:
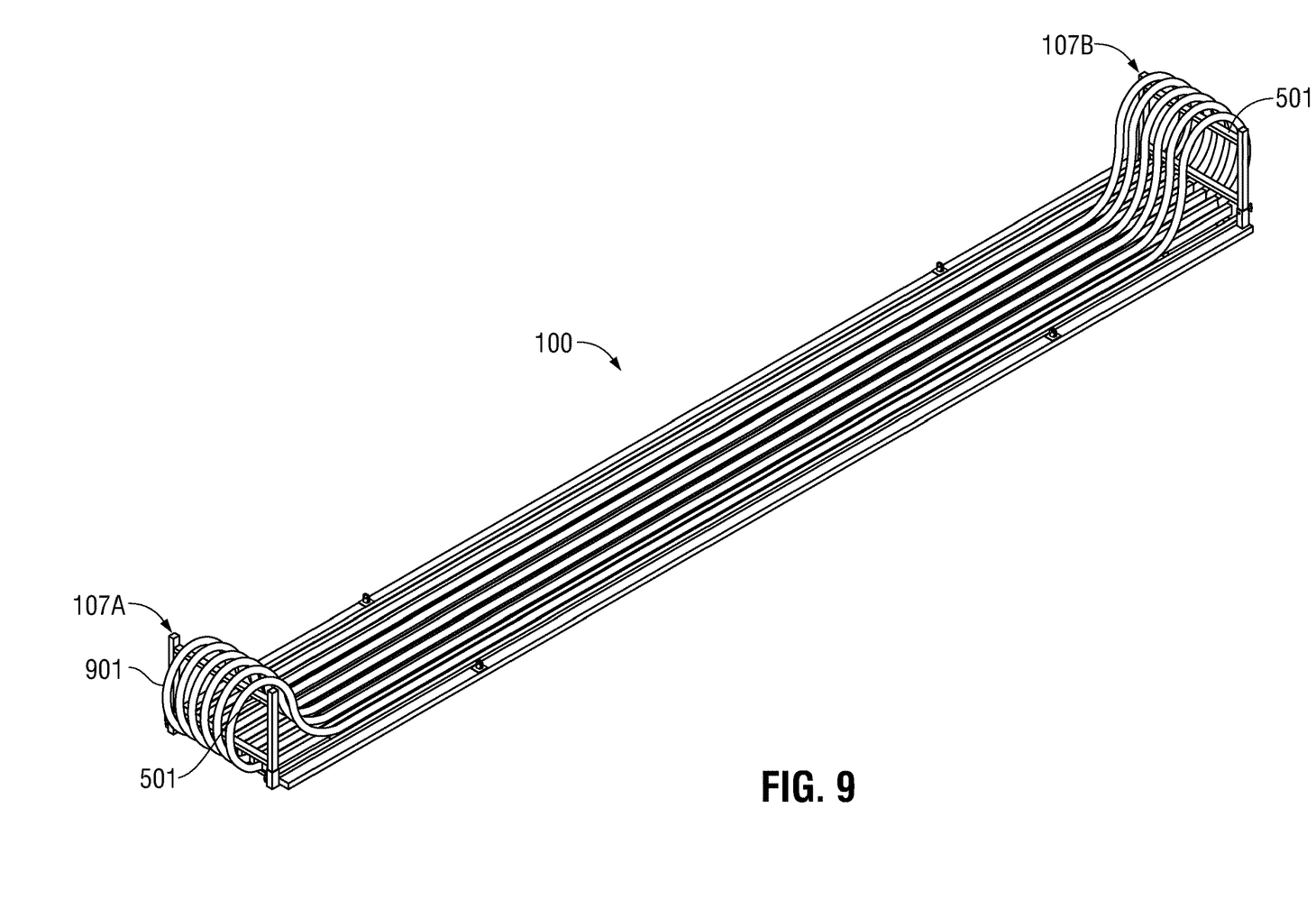
FIG. 9 shows a cable transport structure having a plurality of power cables mounted thereon according to some embodiments.

FIG. 9 illustrates a cable transport structure 100 holding a cable in the transport position according to some embodiments. In this embodiment, a power cable 901 is arranged so that it is centered, lengthwise, over the cable transport structure 100 and laid in one of the channels created between a pair of longitudinal cable retaining members 101. Next, each end of the cable is folded over the upper cross member 501 of a racks 107A-107B and laid into the cable channel as shown. In the particular embodiment depicted, up to six power cables 901 may be laid in the corresponding channels. The channels on each side of the cable transport structure, that is, those formed between a longitudinal cable retaining member and a longitudinal side member, are provided with smaller diameter, signal cables in the same manner. The cables may be then strapped into place on the cable transport structure 100, and the entire structure loaded onto the bed of a semi tractor-trailer for transport. At the well site, the cable transport structure 100 may be offloaded onto the desired location at the well site. The ends of the cables are then unfolded and attached to the equipment to be electrically coupled together at the well site. This arrangement allows a single worker to simply move each end of the cable into place, without having to manipulate the entire weight of the cable as would be the case if it were simply unloaded onto the ground without the use of the cable transport structure 100.

Further, as best seen in FIGS. 6 and 8, it will be noted that the longitudinal base members 103 are constructed from rectangular tubing, and arranged on the cable transport structure 100 such that the shorter side of the rectangle is vertical to the structure, and the longer side of the rectangle is horizontal to the structure. This arrangement provides, effectively, a ramp so that a vehicle driven over the cable transport structure meets the short edge of the rectangle first then rolls onto the higher section created by the longitudinal cable retaining members. This allows a vehicle or other equipment to more easily pass over the top of the cable transport structure without damaging the structure. Moreover, because the cables are located within the channels formed by the longitudinal cable retaining members and or the longitudinal side members, contact between the wheels of the vehicle and the outer shielding of the cables is reduced. This prevents damage to the cables from vehicular traffic at the well site.

In the embodiment depicted in FIG. 9, the structure may be made from rectangular steel tubing, and accommodates six large power cables and two control cables, which are laid into slots between the structure pieces, along the length of the structure. Although the structure may be deployed as a single package, the individual cables may be removed and replaced as desired. While on-site, the cables extend past either end of the cable transport structure, and the racks are removed so that wheeled equipment can be driven over the structure without damaging the cables or the structure. For transport, the racks are reinstalled using the quick release pins and the excess cables folded back over the structure so that the entire length of cables contained within the overall dimensions of the structure for transport.

In some embodiments, the cable transport structures may be made stackable. In these embodiments, vertical support members 503 and 504 of rack 107 may be adapted to provide support for receiving bases mounted at the bottom side of another cable transport structure. In such embodiments, it may be necessary to provide additional supports along the length of the cable transport structure so that the structure will not sag under the weight of the cables.

FIGS. 10A-10F show another cable transport structure 1000 according to embodiments of the present disclosure in which the cable support assemblies at the ends of the cable transport structure have rounded end members as transverse support members (instead of racks 107A and 107B). Stands are further provided to retain and secure the cables. As with previous embodiments, the cable transport structure 1000 is mounted on a trailer bed 1020. The views here illustrate how the cable transport structure 1000 may be advantageously dimensioned and adapted to the trailer bed 1020 with respect to both the length and width of the particular trailer used. In some embodiments, it is useful to group cables together on the transport structure according to destination, plug or connector type, or by intended use at the well site. Each cable group may be handled by an overhead crane or by a suitably rated forklift, for example.

Figure 10A:
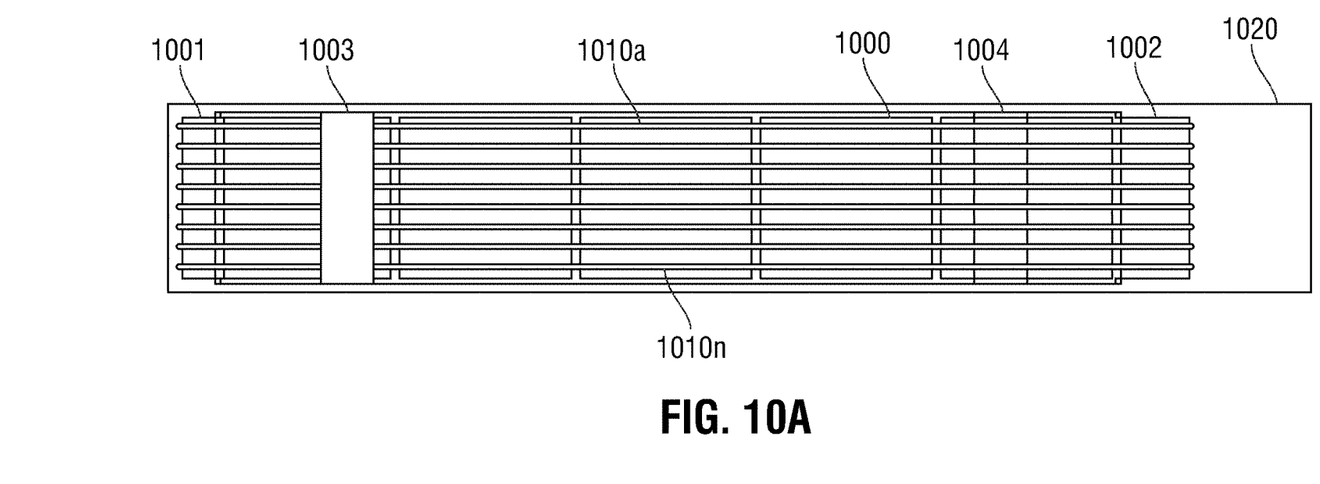
FIGS. 10A-10F show a cable transport structure mounted on a trailer according to an embodiment.
Figure 10B:
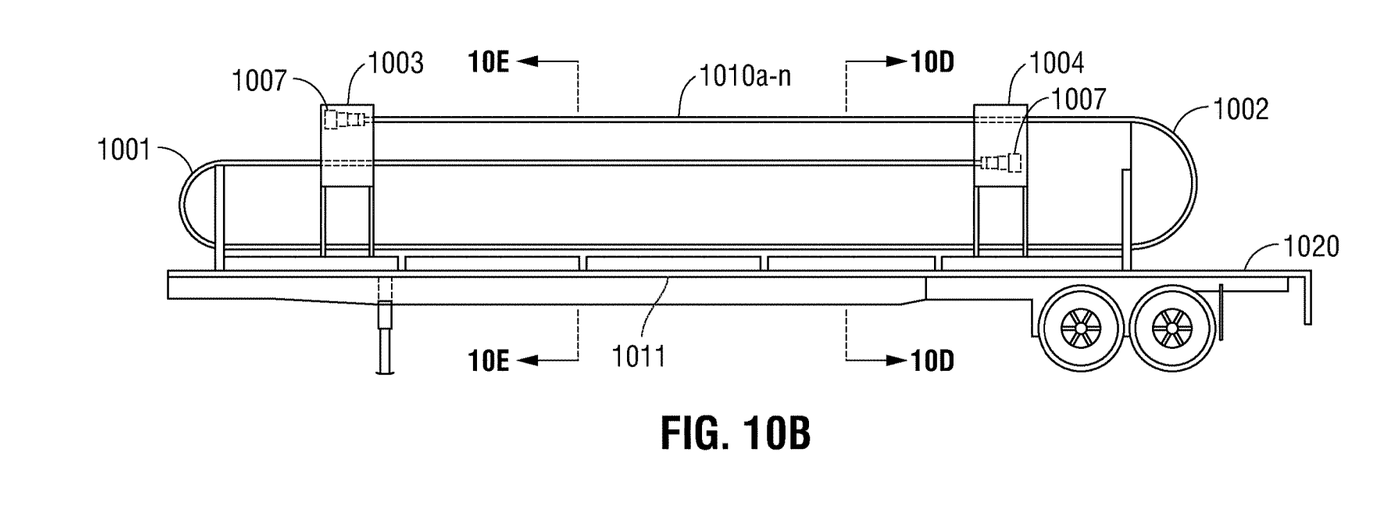
Figure 10C:
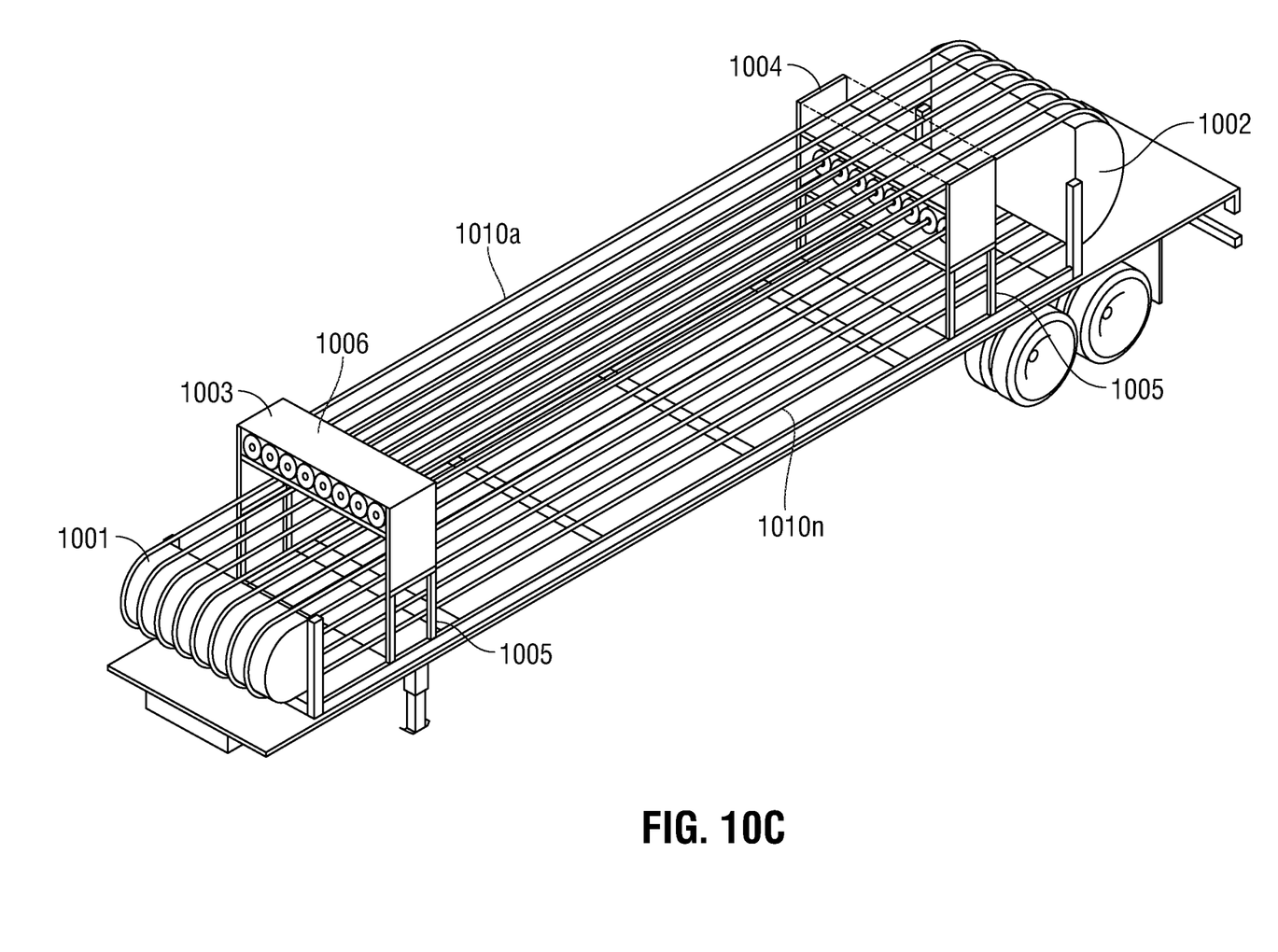

Referring to FIGS. 10A-10C, top, side, and isometric views, respectively, are depicted of a trailer-mounted cable transport structure 1000. The structure 1000 is generally similar to that described earlier with respect to FIGS. 1-9. In addition, the cable support assemblies have first and second rounded end members 1001 and 1002 (best seen in FIGS. 10B and 10C) that support and assist in maintaining cables 1010a-1010n in position during transport or storage. First and second rounded end members 1001 and 1002 may be attachable to and detachable from the cable transport structure 1000 as needed in much the same way as their counterparts, racks 107A and 107B. In some embodiments, the rounded portion of the second rounded end member 1002 may have a larger radius than the rounded portion of the first rounded end member 1001, or vice versa.

Also provided are first and second stands 1003 and 1004 corresponding to first and second rounded end members 1001 and 1002, respectively. Each of the first and second stands 1003 and 1004 may be longitudinally offset from its respective first and second rounded end members 1001 and 1002 by about the same distance, which may be selected as needed. Each stand 1003 and 1004 may have legs or similar support members, one of which is indicated at 1005, and each stand may be provided with a removable cover 1006 for covering any cable end connectors or plugs 1007 secured by the stands. It will be understood that the cables 1010a-1010n may be provided with any number of well-known plugs 1007 or other configurations of end connections to allow the cables to be used with equipment at the well site.

To prepare the cables 1010a-1010n for transport, in one embodiment, the cables 1010a-1010n may be laid out on the cable transport structure 1000 such that the middles of the cables rest roughly at the mid-point between the first and second rounded end members 1001 and 1002. Next, the ends of the cables 1010a-1010n is brought over the first rounded end member 1001 toward the second rounded end member 1002 and secured by the second stand 1004. The other ends of the cables are brought over the second rounded end member 1002 toward the first rounded end member 1001 and secured by first stand 1003. The cable is thus wrapped around or folded over the rounded end members 1001 and 1002 to secure the cable on the transport structure 1000. Those skilled in the art will understand that different orders and arrangements of the cables are possible as a matter of design choice.

Figure 10D:
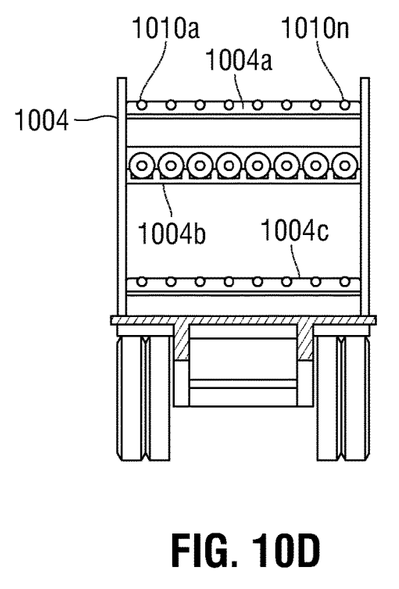
Figure 10E:
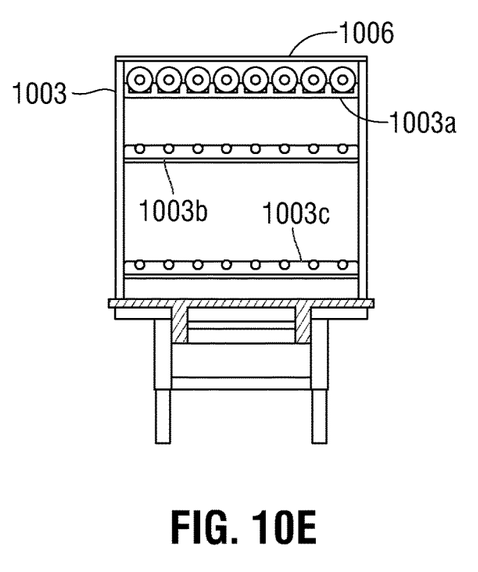
Figure 10F:
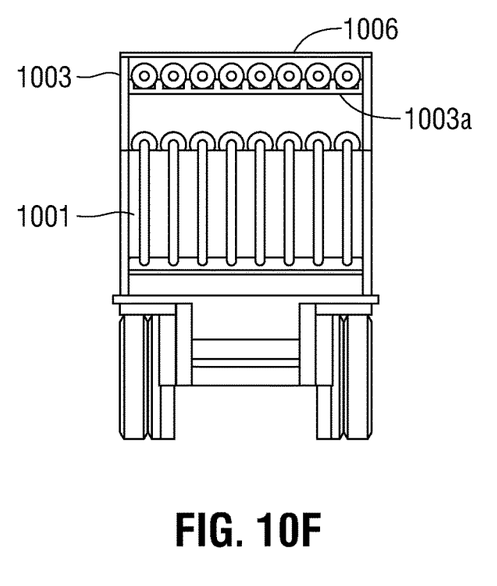

FIGS. 10D and 10E show cross-sectional views of the cable transport structure 1000 long lines A-A and B-B, respectively, as shown in FIG. 10B, while FIG. 10F shows an end view of the cable transport structure 1000 with respect to the first rounded end member 1001. As can be seen, each stand 1003 and 1004 may be composed of individual sections, including an upper, middle, and lower section 1003a, 1003b, 1003c and 1004a, 1004b, 1004c, respectively. Each stand section 1003a, 1003b, 1003c or 1004a, 1004b, 1004c may resemble elevated platforms that can be removably attached (e.g., stacked) to form the stands 1003 or 1004. In some embodiments, locking pins or the like may be used to secure the stand sections to one another. Each stand section 1003a, 1003b, 1003c and 1004a, 1004b, 1004c may also be provided with cable engagement members, such as clamps, channeled surfaces, grooves, and the like, for retaining the cables 1010a-n and/or the plugs 1007 therefor. The particular type of engagement member provided on each stand section may differ depending on whether that section is intended to secure the cables or the cable plugs.

In one embodiment, the cable transport structure 1000, along with unfolded cables 1010a-1010n can remain on the trailer bed 1020 while the cables are used with equipment on-site at the well site. This eliminates the need to remove the transport structure and cables from the trailer before use, thereby saving additional setup time.

In still other embodiments, different methods may be used to arrange the cables on the cable transport structure according to embodiments. For example, as has been discussed, it is useful to lay a cable so that the middle section of the cable is arranged over the middle section of the cable transport structure with equal lengths of cable protruding past each end of the cable transport structure. The ends of the cable may then be folded over the rounded end members and laid onto the structure. Alternatively, one end of the cable may be arranged within a cable channel, such that additional length of cable protrudes from only one end of the cable transport structure. This entire length is then folded back over at least one end retainer, and, depending on the length of the cable, folded again over the second end retainer. Still other arrangements are possible depending on the most efficient way of unfolding cable when the cable transport structure is located at the well site.

It will be understood that embodiments of the cable transport structure according to this disclosure will allow several large cables to be deployed at one time rather than being run individually on site. This reduces the length of cable to be handled manually on-site during setup, and, also the disclosed structure allows the structure to withstand being driven over by the equipment so that equipment can be introduced or pulled out of service without hindrance. The longitudinal base members also eliminate the need for placement of external ramp or other pieces to allow equipment to be driven over the cables. This saves setup time at the well site. Further protection is provided to the cables because they are kept off the ground, and thus less subject to damage.

Accordingly, as set forth above, embodiments of the present disclosure may be implemented in a number of ways. In general, in one aspect, embodiments of the present disclosure relate to a cable transport structure for use in transporting and locating electrical cables at oil and gas well sites. The cable transport structure comprises, among other things, a plurality of longitudinal cable retaining members, and a plurality of transverse structural support members arranged transverse to the plurality of longitudinal cable retaining members, each of the plurality of longitudinal cable retaining members being attached to a top surface of the plurality of transverse structural support members, wherein a cable channel is created between the plurality of longitudinal cable retaining members. The cable transport structure also comprises at least one longitudinal side member arranged at the ends of the plurality of transverse structural support members and running longitudinally along the plurality of longitudinal cable retaining members, wherein a cable channel is created between the at least one longitudinal side member and one of the longitudinal cable retaining members. The cable transport structure further comprises a cable support assembly secured to the cable transport structure at each end thereof, the cable support assembly having a transverse member for supporting a portion of an electrical cable.

In accordance with any one or more of the foregoing embodiments, the cable support assembly is connected to each end of the cable transport structure by quick release pins. In accordance with any one or more of the foregoing embodiments, at least one longitudinal base member is connected to the cable transport structure and configured to support the plurality of transverse structural support members, and/or wherein the at least one longitudinal base member is lower in height than the longitudinal side member to facilitate driving of wheeled equipment over the cable transport structure.

In accordance with any one or more of the foregoing embodiments, the at least one longitudinal base member is provided with a lifting eye configured to allow the cable transport structure to be loaded and unloaded from a flatbed trailer. In accordance with any one or more of the foregoing embodiments, the transverse member of the cable support assembly is a rounded end member adapted to allow the cable to be folded over the rounded end member, and/or wherein one rounded end member has a larger radius than another rounded end member.

In accordance with any one or more of the foregoing embodiments, a stand is disposed on the cable transport structure proximal to each cable support assembly and configured to secure the cable, wherein each stand has a plurality of platform sections, each platform section provided with a plurality of engagement members for engaging a cable or an end connection thereof, and/or wherein the platform sections of each stand are detachable from one another.

In general, in another aspect, embodiments of the present disclosure relate to a method of transporting and locating electrical cables at oil and gas well sites. The method comprises, among other things, providing a cable transport structure that includes a plurality of longitudinal cable retaining members, and a plurality of transverse structural support members arranged transverse to the plurality of longitudinal cable retaining members, each of the plurality of longitudinal cable retaining members being attached to a top surface of the plurality of transverse structural support members, wherein a cable channel is created between the plurality of longitudinal cable retaining members. The cable transport structure also includes at least one longitudinal side member arranged at the ends of the plurality of transverse structural support members and running longitudinally along the plurality of longitudinal cable retaining members, wherein a cable channel is created between the at least one longitudinal side member and one of the longitudinal cable retaining members. The cable transport structure further includes a cable support assembly secured to the cable transport structure at each end thereof, the cable support assembly having a transverse member for supporting a portion of an electrical cable. The method further comprises arranging the cable in the cable channel such that a portion of the cable is supported on the cable support assembly at each end of the cable transport structure, loading the cable transport structure having the cable arranged therein on to a flatbed trailer, and transporting the cable transport structure to a well site on the flatbed trailer.

In accordance with any one or more of the foregoing embodiments, the method further comprises connecting the cable support assembly to each end of the cable transport structure by quick release pins. In accordance with any one or more of the foregoing embodiments, the method further comprises connecting at least one longitudinal base member to the cable transport structure, the at least one longitudinal base member configured to support the plurality of transverse structural support members, and/or wherein the at least one longitudinal base member is lower in height than the longitudinal side member to facilitate driving of wheeled equipment over the cable transport structure. In accordance with any one or more of the foregoing embodiments, the providing the at least one longitudinal base member with a lifting eye, the lifting eye allowing the cable transport structure to be loaded and unloaded from the flatbed trailer.

In accordance with any one or more of the foregoing embodiments, the transverse member of the cable support assembly is a rounded end member, the method further comprising folding a portion of the cable over the rounded end member and/or wherein one rounded end member has a larger radius than another rounded end member.

In accordance with any one or more of the foregoing embodiments, the method further comprises providing a stand disposed on the cable transport structure proximal to each cable support assembly and securing the cable in the cable transport structure, wherein each stand has a plurality of platform sections, each platform section provided with a plurality of engagement members for engaging a cable or an end connection thereof, and/or wherein the platform sections of each stand are detachable from one another.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A plug assembly for temporarily blocking fluid flow in a casing string of an oil and gas well, comprising:
    a top sub having an interior bore;
    a bottom sub disposed downhole of the top sub and having an interior bore; a middle sub coupled to the top sub and the bottom sub there between, the middle sub having an interior bore, a fluid channel extending along a length of the middle sub, and a valve that, when opened, allows fluid to flow from the interior bore of the middle sub into the fluid channel; and
    a sleeve mounted coaxially between the top sub and the middle sub adjacent to the fluid channel, the sleeve having a debris barrier attached thereto and positioned adjacent to the middle sub, the debris barrier separating the interior bore of the middle sub from the interior bore of the top sub;
    wherein the sleeve is configured to move uphole along the top sub in response to fluid pressure in the fluid channel such that the debris barrier is withdrawn from a fluid flow path through the interior bores of the top sub and the middle sub and
    wherein the sleeve and the top sub define a pocket area between the sleeve and a downhole end of the top sub and the debris barrier is withdrawn into the pocket area when the sleeve moves uphole along the top sub.

2. The plug assembly of claim 1, wherein the valve is opened in response to fluid pressure in the interior bore of the middle sub.

3. The plug assembly of claim 1, wherein the valve comprises a rupture disc.

4. The plug assembly of claim 1, wherein the debris barrier comprises an elastomer membrane.

5. The plug assembly of claim 1, further comprising a dissolvable plug adjacent to and coaxial with the middle sub, the dissolvable plug preventing fluid flow through the plug assembly to thereby maintain an air pocket between the plug assembly and the casing string.

6. The plug assembly of claim 5, wherein the dissolvable plug comprises compressed salt.

7. The plug assembly of claim 1, wherein the sleeve moves by sliding along a portion of the top sub in response to fluid pressure in the fluid channel.

8. An apparatus for temporarily preventing fluid flow through a casing string in an oil and gas well, the apparatus comprising:
    a first tubular member;
    a second tubular member coupled to the first tubular member and having a valve that, when opened, permits fluid flow from an interior of the second tubular member into a fluid channel of the second tubular member; and
    a sleeve arranged coaxially between the first tubular member and the second tubular member adjacent to the fluid channel, the sleeve configured to slide over an outer surface of the first tubular member in response to fluid pressure in the fluid channel, the sleeve having an elastomer member attached thereto that serves to separate an interior of the first tubular member from the interior of the second tubular member.

9. The apparatus of claim 8, wherein the valve is opened in response to fluid pressure in the interior of the second tubular member.

10. The apparatus of claim 8, wherein the valve comprises a rupture disc.

11. The apparatus of claim 8, wherein the sleeve and the first tubular member define a pocket area there between and the elastomer member is dragged into the pocket area when the sleeve slides over the outer surface of the first tubular member.

12. The apparatus of claim 8, further comprising a removable plug adjacent to and coaxial with the second tubular member.

13. The apparatus of claim 12, wherein the removable plug comprises compressed salt that can be dissolved by fluid in the interior of the first and second tubular members.

14. The apparatus of claim 8, wherein the first and second tubular members define a chamber there between to receive the sleeve when the sleeve slides over the outer surface of the first tubular member in response to fluid pressure in the fluid channel.

15. A method of temporarily plugging fluid flow through a tubular string of an oil and gas well, the method comprising:
    providing a first tubular member;
    coupling a second tubular member to the first tubular member, the second tubular member having a valve that, when opened, permits fluid flow from an interior of the second tubular member into a fluid channel of the second tubular member; and
    mounting a sleeve between the first tubular member and the second tubular member, the sleeve configured to slide over an outer surface of the first tubular member in response to fluid pressure in the fluid channel, the sleeve having an elastomer member attached thereto that serves to separate the interior of the first tubular member from the interior of the second tubular member.

16. The method of claim 15, further comprising opening the valve by increasing hydraulic pressure in the interior of the first and second tubular members.

17. The method of claim 16, wherein the valve is a rupture disc and opening the valve comprises rupturing the rupture disc.

18. The method of claim 15, further comprising sliding the sleeve over the outer surface of the first tubular member using fluid pressure in the fluid channel.

19. The method of claim 15, wherein the elastomer member is withdrawn from a fluid flow path through the interiors of the first and second members when the sleeve slides along the first tubular member.

20. A plug assembly for temporarily blocking fluid flow in a casing string of an oil and gas well, comprising:
    a top sub having an interior bore;
    a bottom sub disposed downhole of the top sub and having an interior bore; a middle sub coupled to the top sub and the bottom sub there between, the middle sub having an interior bore, a fluid channel extending along a length of the middle sub, and a valve that, when opened, allows fluid to flow from the interior bore of the middle sub into the fluid channel; and
    a sleeve mounted coaxially between the top sub and the middle sub adjacent to the fluid channel, the sleeve having a debris barrier attached thereto and positioned adjacent to the middle sub, the debris barrier separating the interior bore of the middle sub from the interior bore of the top sub;
    wherein the sleeve is configured to move uphole along the top sub in response to fluid pressure in the fluid channel such that the debris barrier is withdrawn from a fluid flow path through the interior bores of the top sub and the middle sub, and further comprising a dissolvable plug adjacent to and coaxial with the middle sub, the dissolvable plug preventing fluid flow through the plug assembly to thereby maintain an air pocket between the plug assembly and the casing string.

21. The plug assembly of claim 20, wherein the dissolvable plug comprises compressed salt.

* * * * *